United States Patent
Zhang

(10) Patent No.: US 9,696,844 B2
(45) Date of Patent: Jul. 4, 2017

(54) INDUCTIVE TOUCH SCREEN, DISPLAY PANEL AND DISPLAY APPARATUS

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Jinzhong Zhang, Beijing (CN)

(73) Assignees: BOE TECHNOLOGY GROUP CO., LTD. (CN); BEIJING BOE OPTOELECTRONICS TECHNOLOGY CO., LTD. (CN)

( * ) Notice: Subject to any disclaimer, the term of this patent is extended or adjusted under 35 U.S.C. 154(b) by 108 days.

(21) Appl. No.: 14/436,801

(22) PCT Filed: Aug. 29, 2014

(86) PCT No.: PCT/CN2014/085586
§ 371 (c)(1),
(2) Date: Apr. 17, 2015

(87) PCT Pub. No.: WO2015/139424
PCT Pub. Date: Sep. 24, 2015

(65) Prior Publication Data
US 2016/0283010 A1    Sep. 29, 2016

(30) Foreign Application Priority Data
Mar. 20, 2014 (CN) .......................... 2014 1 0104325

(51) Int. Cl.
*G06F 3/041* (2006.01)
*G06F 3/046* (2006.01)
(Continued)

(52) U.S. Cl.
CPC ............ *G06F 3/0416* (2013.01); *G06F 3/044* (2013.01); *G06F 3/045* (2013.01); *G06F 3/046* (2013.01);
(Continued)

(58) Field of Classification Search
CPC ........ G06F 3/0416; G06F 3/044; G06F 3/045; G06F 3/046; G06F 2203/04108; G06F 3/047
See application file for complete search history.

(56) References Cited

U.S. PATENT DOCUMENTS

2007/0018076 A1* 1/2007 Chen .................... G06F 3/046
250/208.2
2007/0200487 A1* 8/2007 Uno ...................... G06F 3/046
313/500
(Continued)

FOREIGN PATENT DOCUMENTS

CN      101727252      6/2010
CN      201673493 U    12/2010
(Continued)

OTHER PUBLICATIONS

Chinese Office Action Dated Mar. 25, 2016.
(Continued)

*Primary Examiner* — Tom Sheng
(74) *Attorney, Agent, or Firm* — Brooks Kushman P.C.

(57) ABSTRACT

The present disclosure provides an inductive touch screen, a display panel and a display apparatus. The inductive touch screen includes a first electromagnetic induction layer including a plurality of first conductive lines arranged in a first direction; a second electromagnetic induction layer including a plurality of second conductive lines arranged in a second direction, and the second conductive lines being intersected with and isolated from the first conductive lines;
(Continued)

a driver circuit connected to the first conductive lines and the second conductive lines and configured to alternately supply driving current to the first conductive lines and the second conductive lines to cause the first conductive lines or the second conductive lines to generate a magnetic fields; and a sensor circuit connected to the first conductive lines and the second conductive lines and configured to sense variation of currents in the first conductive lines or the second conductive lines.

19 Claims, 3 Drawing Sheets

(51) Int. Cl.
  *G06F 3/047*  (2006.01)
  *G06F 3/044*  (2006.01)
  *G06F 3/045*  (2006.01)
(52) U.S. Cl.
  CPC .... *G06F 3/047* (2013.01); *G06F 2203/04108* (2013.01)

(56) References Cited

U.S. PATENT DOCUMENTS

| | | | | |
|---|---|---|---|---|
| 2011/0285454 A1* | 11/2011 | Bayramoglu | ........... | G06F 3/046 327/517 |
| 2012/0154326 A1* | 6/2012 | Liu | ........... | G06F 3/0412 345/174 |
| 2012/0154327 A1* | 6/2012 | Liu | ........... | G06F 3/0412 345/174 |
| 2012/0169400 A1* | 7/2012 | Liu | ........... | G06F 3/0416 327/517 |
| 2012/0229420 A1* | 9/2012 | Liu | ........... | G06F 3/041 345/174 |
| 2012/0249440 A1* | 10/2012 | Yi | ........... | G06F 3/04883 345/173 |
| 2014/0055404 A1 | 2/2014 | Cho et al. | | |

FOREIGN PATENT DOCUMENTS

| | | |
|---|---|---|
| CN | 103049130 | 4/2013 |
| CN | 103294295 | 9/2013 |
| CN | 103902132 | 7/2014 |
| CN | 203733099 | 7/2014 |
| JP | 07129304 | 5/1995 |
| TW | 200928932 | 7/2009 |

OTHER PUBLICATIONS

Written Opinion and International Search Report dated Mar. 20, 2014.
Office Action in Chinese Patent Application No. 201410104325.4, dated Oct. 26, 2016.

\* cited by examiner

INDUCTIVE TOUCH SCREEN, DISPLAY PANEL AND DISPLAY APPARATUS

CROSS-REFERENCE TO RELATED APPLICATION APPLICATIONS

The present application is the U.S. National Phase of International Patent Application No. PCT/CN2014/085586, filed on Aug. 29, 2014 which claims the priority of Chinese patent application No. 201410104325.4, filed on Mar. 20, 2014, the disclosure of which is incorporated herein by reference.

TECHNICAL FIELD

The present disclosure relates to the field of touch technology, and more particular to an inductive touch screen, a display panel and a display apparatus.

BACKGROUND

Touch technology has progressively replaced the conventional keyboard and the mouse for inputting, and is more convenient and easier to use. A touch screen is more and more popular in the market for its user friendly features. In particular, the touch screen is prevailing in the field of smart mobile terminals.

Currently, the touch screens generally include a resistive touch screen and a capacitive touch screen. In the resistive touch screen, a touch panel is coated with a thin metallic conductive layer and a resistive layer. When the panel is touched, the thin metallic conductive layer is contacted with the resistive layer, a position of the touching event is recorded by closing a switch, and information is transmitted to a controller for further processing. In the capacitive touch screen, the touch panel is coated with a material which may store electric charges. When the panel is touched, a small amount of electric charges are accumulated at a contacted point, such electric charges are measured by circuits at each corner of the panel, and information is transmitted to a controller for processing.

In the resistive touch screen, a two-point touch is implemented by the contact of an upper inductive electrode and a lower inductive electrode; however, a multi-point touch is difficult to be implemented. In the capacitive touch screen, a multi-point touch may be implemented by a mutual capacitance between an emitting electrode and an inductive electrode. Furthermore, the touching function may be implemented without applying firm pressure on the capacitive touch screen, which is outstanding in prompt response. Thus, the capacitive touch screen is prevailing in the business market.

However, the touching has to be implemented by contacting the screen with a finger on either the resistive touch screen or the capacitive touch screen, and a non-contacted touch may not be implemented on the resistive touch screen and the capacitive touch screen.

SUMMARY

In view of this, the preset disclosure provides an inductive touch screen, a display panel and a display apparatus which are non-contacted touch sensitive.

For solving the above technical problem, the present disclosure provides in one embodiment an inductive touch screen including:

a first electromagnetic induction layer including a plurality of first conductive lines arranged in a first direction;

a second electromagnetic induction layer including a plurality of second conductive lines arranged in a second direction, and the second conductive lines being intersected with and isolated from the first conductive lines;

a driver circuit connected to the first conductive lines and the second conductive lines and configured to alternately supply driving currents to the first conductive lines and the second conductive lines to cause the first conductive lines or the second conductive lines to generate magnetic fields; and a sensor circuit connected to the first conductive lines and the second conductive lines and configured to sense variation of currents in the first conductive lines or the second conductive lines, so as to determine a touching position of a touching conductor.

The sensor circuit includes a plurality of sensor sub-circuits corresponding to the first conductive lines and the second conductive lines in a one-to-one manner.

Each of the sensor sub-circuits includes:

a current sensing amplifier circuit having an end connected to one end of a corresponding one of the first or second conductive lines and an another end connected to an inductive capacitor, the current sensing amplifier circuit being configured to sense the variation of current in the corresponding one of the first or second conductive lines, and the corresponding one of the first or second conductive lines being connected to an input terminal of the driver circuit; and the inductive capacitor having an end connected to the current sensing amplifier circuit and an another end connected to an output terminal of the driver circuit.

The inductive touch screen further includes a processing unit connected to the sensor circuit, and configured to receive the variation of the currents in the conductive lines sensed by the sensor circuit and determine the touching position of the touching conductor based on the variation of the currents.

The processing unit is provided with a predetermined threshold; the processing unit judges whether a touching is valid by comparing the variation of the currents with the predetermined threshold. When the variation of the currents is less than the predetermined threshold, judging that the touching is invalid; when the variation of the currents is not less than the predetermined threshold, judging that the touching is valid.

A spacing between every two adjacent first conductive lines is identical.

The spacing between every two adjacent first conductive lines is 100-800 µm.

A spacing between every two adjacent second conductive lines is identical.

The spacing between every two adjacent second conductive lines is 100-800 µm.

The present disclosure further provides a display panel, including the above inductive touch panel.

The display panel may further include an array substrate including gate lines and data lines; the first conductive lines are arranged to be overlapped with the gate lines, respectively; and the second conductive lines are arranged to be overlapped with the data lines, respectively.

The inductive touch screen further includes connection wires arranged at each of two ends of each of the first conductive lines and the second conductive lines, the first conductive lines and the second conductive lines are connected to the driver circuit and the sensor circuit by the connection wires, and the connection wires are provided within a non-displaying area of the display panel.

The present disclosure further provides a display apparatus, including the above display panel.

In the present disclosure, the technical effects of the above technical solutions are as follows.

The non-contacted touch may be implemented, i.e. the sensing of the touching may be implemented without touching the touch screen by the finger, and such non-contacted touch is in high sensitivity and provides better touching experiences.

DETAILED DESCRIPTION

In order to make the technical problems to be solved, the technical solutions and the advantages of the present disclosure more apparent, the present disclosure will be described hereinafter in conjunction with the drawings and the embodiments.

The present disclosure provides in one embodiment an inductive touch screen. The inductive touch screen includes:

a first electromagnetic induction layer, including a plurality of first conductive lines arranged in a first direction;

a second electromagnetic induction layer, including a plurality of second conductive lines arranged in a second direction, and the second conductive lines being intersected with and isolated from the first conductive lines;

a driver circuit, connected with the first conductive lines and the second conductive lines and configured to alternately supply a driving current to the first conductive lines and the second conductive lines to cause the first conductive lines or the second conductive lines to generate magnetic fields; and a sensor circuit, connected with the first conductive lines and the second conductive lines and configured to induce variation of currents in the first conductive lines or the second conductive lines, so as to determine a touching position of a touching conductor.

Figure 1:
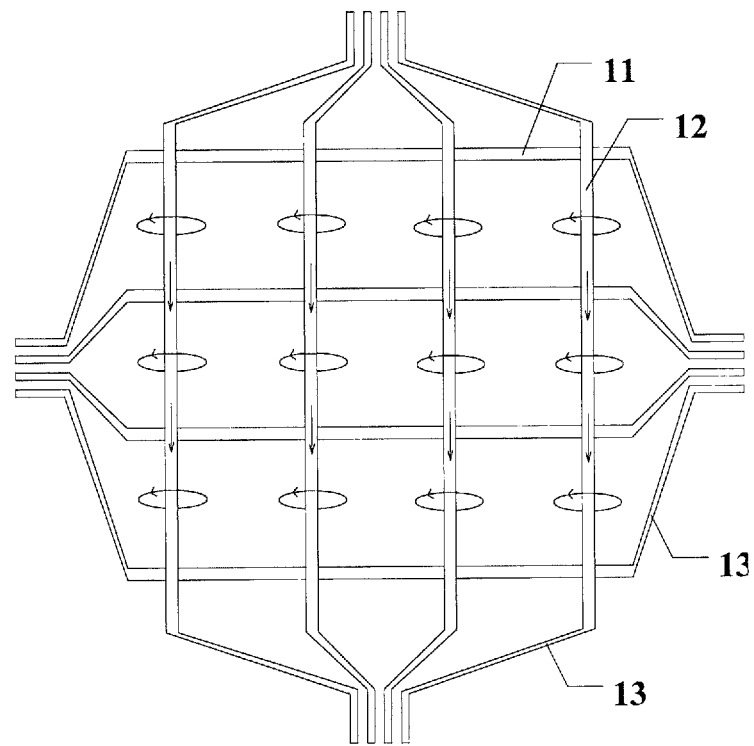
FIG. 1 is a top view of an inductive touch panel according to one embodiment of the present disclosure.

Referring to FIG. 1, which is a top view of an inductive touch panel according to one embodiment of the present disclosure. The first electromagnetic induction layer includes four first conductive lines 11 arranged in a first (horizontal) direction, and the second electromagnetic induction layer includes four second conductive lines 12 arranged in a second (vertical) direction.

As an example, each of the first electromagnetic induction layer and the second electromagnetic induction layer shown in FIG. 1 includes four conductive lines; in practical implementation, the number of conductive lines is more than four. Furthermore, the number of the conductive lines in the first electromagnetic induction layer and the number of the conductive lines in the second electromagnetic induction layer may be equal or different.

As shown in FIG. 1, the first conductive lines 11 in the first electromagnetic induction layer are horizontally arranged, the second conductive lines 12 in the second electromagnetic induction layer are vertically arranged, and the first conductive lines 11 and the second conductive lines 12 intersect at right angles. It is easier to locate a touching conductor (for example, a finger) by a locating grid defined by the horizontal conductive lines and the vertical conductive lines intersecting at right angles. Of course, the first conductive lines and the second conductive lines may be arranged in other manner in another embodiment of the present disclosure. For example, each of the first conductive lines and the second conductive lines are arranged in tilting directions, as long as the locating grid may be defined by the intersection of the first conductive lines and the second conductive lines.

The first electromagnetic induction layer and the second electromagnetic induction layer may be arranged on an identical substrate, and an isolation layer is provided between the first electromagnetic induction layer and the second electromagnetic induction layer.

For convenience of connecting, the inductive touch screen in one embodiment of the present disclosure further includes connection wires arranged at each of two ends of each of the first and second conductive lines. The first conductive lines and the second conductive lines are connected to the driver circuit and the sensor circuit by the connection wires. Referring to FIG. 1, in the embodiment of the present invention, the connection wires 13 are bending lines at each of the two ends of each of the horizontally arranged first conductive lines 11 and the vertically arranged second conductive lines 12.

For convenience of locating, in one embodiment of the present disclosure, optionally, a spacing between every two adjacent first conductive lines is identical. A spacing between every two adjacent second conductive lines is identical.

For improving light transmittance, a spacing between every two adjacent conductive lines in the same electromagnetic induction layer cannot be set to be undersized. Optionally, the spacing between every two adjacent first conductive lines may be set to 100-800 μm. The spacing between every two adjacent second conductive lines may be set to 100-800 μm.

It can be seen from above description that, in one embodiment of the present disclosure, an area occupied by the first conductive lines and the second conductive lines is small, the light transmittance is improved and the power consumption is reduced comparing with the conventional resistive touch screen in which a whole layer is occupied.

Optionally, in one embodiment of the present disclosure, the driver circuit simultaneously supplies driving currents to all of the conductive lines in the same electromagnetic induction layer, and alternately supplies the driving currents to the conductive lines on different electromagnetic induction layers.

For convenience of simultaneously supplying the driving currents to all of the conductive lines in the same electromagnetic induction layer, optionally, all of the conductive lines in the same electromagnetic induction layer are connected in parallel.

Figure 2:
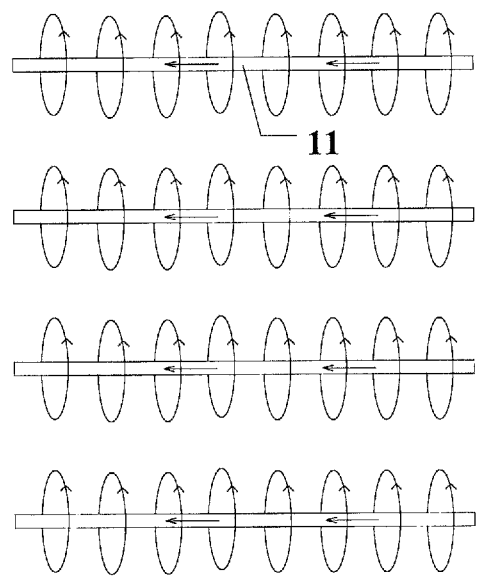
FIG. 2 is a view showing a magnetic field distribution of first conductive lines arranged in a first direction shown in FIG. 1, when a driving current flows through the first conductive lines.
Figure 3:
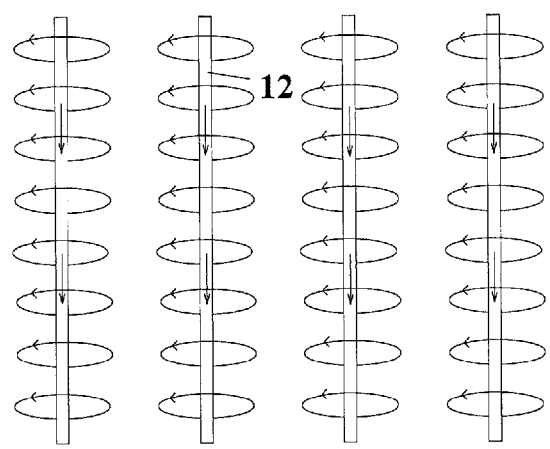
FIG. 3 is a view showing a magnetic field distribution of second conductive lines arranged in a second direction shown in FIG. 1, when a driving current flows through second conductive lines.

Referring to FIGS. 2 and 3, FIG. 2 is a view showing a magnetic field distribution of the first conductive lines 11 arranged in the first direction shown in FIG. 1, when a driving current flows through the first conductive lines 11; FIG. 3 is a view showing a magnetic field distribution of the second conductive lines 12 arranged in the second direction shown in FIG. 1, when a driving current flows through second conductive lines 12.

It can be seen from FIGS. 2 and 3 that circular magnetic fields may be generated around the first conductive lines 11 or the second conductive lines 12 by the electromagnetic induction when currents flow through the first conductive lines 11 or the second conductive lines 12. Directions of the magnetic fields and the directions of the currents are compliant with the right-hand rule.

Furthermore, since the driver circuit simultaneously supplies the driving currents to all of the conductive lines in the same electromagnetic induction layer, thus the directions of the currents in all of the conductive lines in the same electromagnetic induction layer are same at the same time and the directions of the corresponding magnetic fields are also same.

Figure 4:
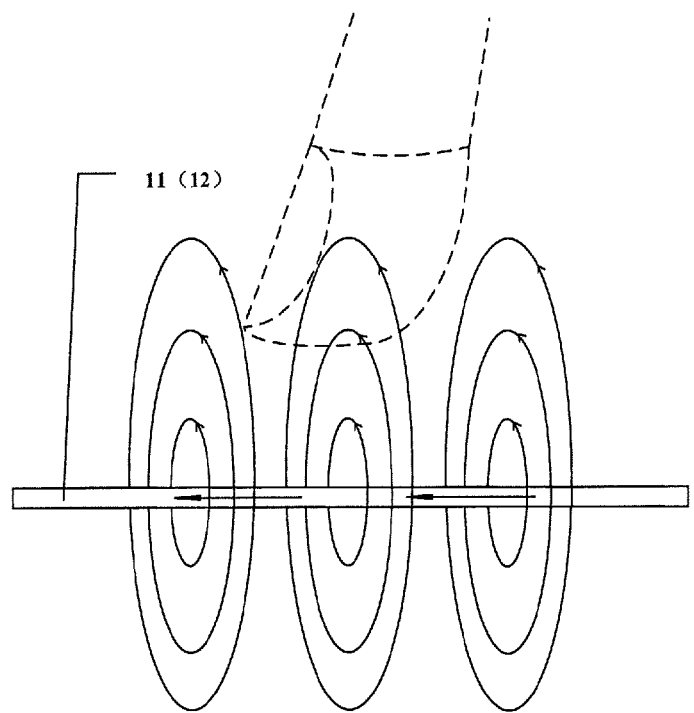
FIG. 4 is a schematic view illustrating magnetic fields cut by a finger according to one embodiment of the present disclosure.

Referring to FIG. 4, FIG. 4 is a schematic view illustrating the magnetic fields cut by a finger according to one embodiment of the present disclosure. After the finger or other touching conductor cutting the magnetic fields generated by the conductive lines, inductive currents may be generated in the conductive lines, and directions of the inductive currents are opposite to the directions of the driving currents transmitted in the conductive lines. Due to the presence of the inductive current, the overall value of the current in the conductive line is diminished, and a variation of the current in the conductive line may be sensed by the sensor circuit.

During the period that the first conductive lines arranged in the first direction are supplied with the driving currents, the second conductive lines arranged in the second direction are not supplied with the driving currents. During this period, the circular magnetic fields are generated around the first conductive lines arranged in the first direction, and when the finger approaches, the inductive currents are generated in the first conductive lines arranged in the first direction. The overall value of current in the first conductive line may be reduced by the inductive current, and the variation of the current in the first conductive line may be sensed by the sensor circuit. Because each of the first conductive lines is independent, a coordinate of the touching position of the touching conductor in the first direction may be accurately located.

During the period that the second conductive lines arranged in the second direction are supplied with the driving currents, the first conductive lines arranged in the first direction are not supplied with the driving currents. During this period, the circular magnetic fields are generated around the second conductive lines arranged in the second direction, and when the finger approaches, the inductive currents are generated in the second conductive lines arranged in the second direction. The overall value of current in the second conductive line may be reduced by the inductive current, and the variation of the current in the second conductive line may be sensed by the sensor circuit. Because each of the second conductive lines is independent, a coordinate of the touching position of the touching conductor in the second direction may be accurately located.

The driver circuit alternately supplies the driving currents to the first conductive lines and the second conductive lines by timing control. Since time required for alternating is tiny, the coordinate in the first direction and the coordinate in the second direction are obtained nearly at the same time comparing with a moving speed of the touching conductor, and thus an accurate position touched by the touching conductor may be obtained.

Since each of the conductive lines in the same layer is independent, thus when a second figure or more fingers are touching, current coordinates of each finger may be independently sensed by each of the conductive lines. As a result, a position of each finger may be accurately located, so that the multi-point touch is implemented.

In one embodiment of the present disclosure, the variation of the current in the conductive line may refer to a variation of the amplitude of the current in the conductive line.

The non-contacted touch may be implemented by the inductive touch screen according to the above embodiment of the present disclosure. That is, the sense of touching may be implemented without contacting the inductive touch screen by the touching conductor, which has high sensitivity and provides better touching experiences.

Although the horizontally arranged conductive lines are the first conductive lines and the vertically arranged conductive lines are the second conductive lines, the first conductive lines and the second conductive lines in the present disclosure are not limited thereto. Alternatively, the vertically arranged conductive lines may be referred as the first conductive lines and the horizontally arranged conductive lines may be referred as the second conductive lines Hereinafter, the sensor circuit according to one embodiment of the present disclosure is explained with examples.

According to one embodiment of the present disclosure, the sensor circuit may include a plurality of sensor sub-circuits which are corresponding to the first conductive lines and the second conductive lines in a one-to-one manner. Each of the sensor sub-circuits includes:

a current sensing amplifier circuit having an end connected to one end of a corresponding one of the first or second conductive lines and an another end connected to an inductive capacitor; the current sensing amplifier circuit being configured to sense the variation of current in the corresponding first or second conductive line, and the corresponding first or second conductive line being connected to an input terminal of the driver circuit; and the inductive capacitor having an end connected to the current sensing amplifier circuit and an another end connected to an output terminal of the driver circuit.

Figure 5:
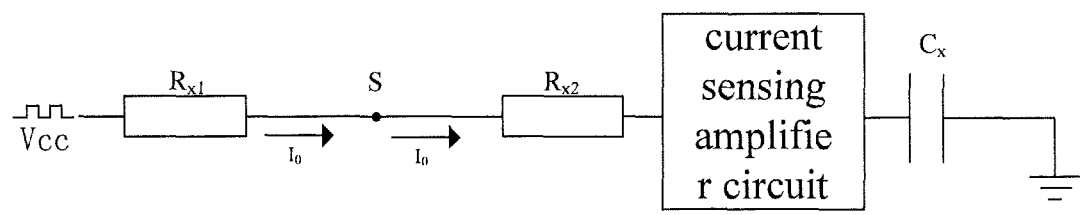
FIG. 5 is a schematic view illustrating an equivalent circuit of a sensor sub-circuit before touching the inductive touch panel according to one embodiment of the present disclosure.

Referring to FIG. 5, FIG. 5 is a schematic view illustrating an equivalent circuit of a sensor sub-circuit before touching the inductive touch panel according to one embodiment of the present disclosure.

The equivalent circuit includes:

a first resistor $R_{x1}$ and a second resistor $R_{x2}$ of the conductive line (the first conductive line or the second conductive line); dividing the conductive line by a touching position S of the touching conductor, the first resistor $R_{x1}$ representing a resistance of one part of the conductive line that is on a left side of the touching position S and the second resistor $R_{x1}$ representing a resistance of one part of the conductive line that is on a right side of the touching position S; and one end of the conductive line is connected to the input terminal $V_{cc}$ of the driver circuit;

a current sensing amplifier circuit having one end connected to the other end of the conductive line, and an another end connected to an inductive capacitor $C_x$; the current sensing amplifier circuit being configured to sense the variation of the current in the conductive line;

the inductive capacitor $C_x$, having an end connected to the current sensing amplifier circuit, and an another end connected to the ground (i.e., the output terminal of the driver circuit).

In one embodiment of the present disclosure, the driver circuit is required to supply alternating driving current to the conductive line due to the presence of the inductive capacitor $C_x$, so that the current may pass through the inductive capacitor $C_x$. When the conductive line is supplied with the alternating driving current, a circular magnetic field is generated around the conductive line. Since the direction of the current is alternately changed, thus a direction of the magnetic field generated by the current is also alternately changed, but the direction of the magnetic field always encircles around the conductive line.

Under the driving of the alternating current, the capacitor $C_x$ is equivalent to a current path, and the amplitude of the normal driving current $I_0$ is sensed by the current sensing amplifier circuit before the inductive touch screen being touched.

Figure 6:
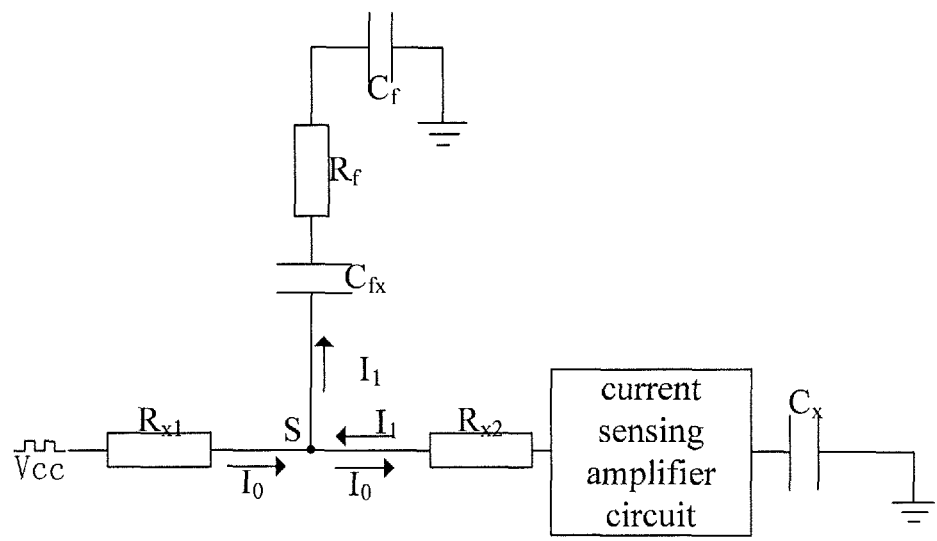
FIG. 6 is a schematic view illustrating an equivalent circuit of a sensor sub-circuit when touching the inductive touch panel according to one embodiment of the present disclosure.

Referring to FIG. 6, FIG. 6 is a schematic view illustrating an equivalent circuit of a sensor sub-circuit when touching the inductive touch panel according to one embodiment of the present disclosure.

When the touching conductor approaches the inductive touch screen, the touching conductor is electrically connected to the conductive line corresponding to an approaching position. As illustrated in FIG. 6, a capacitor $C_{fx}$ represents a capacitance between the touching conductor and the conductive line, $R_f$ represents the self-resistance of the touching conductor, and the $C_f$ represents the self-capacitance of the touching conductor.

Under the driving of the alternating current, the capacitors $C_x$, $C_{fx}$ and $C_f$ are equivalent to a current path; when the inductive touch screen is touched, the current in the conductive line is diminished due to the presence of the inductive current $I_1$, and the amplitude of the current in the conductive line sensed by the current sensing amplifier circuit is changed.

For determining the touching position of the touching conductor, the inductive touch screen according to the one embodiment of the present disclosure may further include:

a processing unit, connected to the sensor circuit and configured to receive the variation of the currents in the conductive lines sensed by the sensor circuit, and determine the touching position of the touching conductor in accordance with the variation of the currents.

For the purpose of shielding noise signals and avoiding the misrecognition of an incorrect operation, the processing unit according to one embodiment of the present disclosure may be further provided with a predetermined threshold. The processing unit is further configured to judge whether the touching is valid by comparing the variation of the current and the predetermined threshold. For example, it is judged that the touching is invalid when the variation of the current is less than the predetermined threshold, and it is judged that the touching is valid when the variation of the current is not less than the predetermined threshold. By providing such threshold, it is judged that the touching is invalid when the variation of the current in the first conductive line or the second conductive line is undersized, and thus the inductive touch screen does not make a response.

Therefore, the noise signal may be shielded, and it is ensured that only a touching action within a predetermined distance may be recognized as a valid action. As a result, the misrecognition of the incorrect operation is avoided.

The present disclosure provides in one embodiment a display panel, including the inductive touch panel according to the above embodiments.

For minimizing the adverse effect on the display quality of the display panel, both the first conductive lines and the second conductive lines in one embodiment of the present disclosure may be made of transparent and conductive materials, such as tin indium oxide (ITO) or indium zinc oxide (IZO).

The display panel may further include an array substrate having gate lines and data lines. The first conductive lines are arranged to be overlapped with the gate lines, respectively, and the second conductive lines are arranged to be overlapped with the data lines, respectively.

When the first conductive lines are arranged to be overlapped with the gate lines, respectively, and the second conductive lines are arranged to be overlapped with the data lines, respectively, the first conductive lines and the second conductive lines in one embodiment of the present disclosure may not adversely affect the display quality of the display panel. As a result, in one embodiment of the present disclosure, both the first conductive lines and the second conductive lines may be made of opaque and conductive materials.

For convenience of connecting, the inductive touch screen in one embodiment of the present disclosure may further include connection wires arranged at each of two ends of each of the first conductive lines and the second conductive lines. The first conductive lines and the second conductive lines are connected to the driver circuit and the sensor circuit by the connection wires. In order to not adversely affecting the sensing of the touching on the inductive touch screen, the connection wires are provided within a non-displaying area of the display panel.

The present disclosure further provides in the embodiment a display apparatus including the above display panel.

The present disclosure further provides in the embodiment a method for manufacturing an inductive touch screen, including:

a step of forming a first electromagnetic induction layer which includes a plurality of first conductive lines arranged in a first direction;

a step of forming a second electromagnetic induction layer which includes a plurality of second conductive lines arranged in a second direction, and the second conductive lines being intersected with and isolated from the first conductive lines;

a step of forming a driver circuit which is connected to the first conductive lines and the second conductive lines and alternately supplies driving currents to the first conductive lines and the second conductive lines, so that the first conductive lines or the second conductive lines supplied with the driving currents generate magnetic fields;

a step of forming a sensor circuit which is connected to the first conductive lines and the second conductive lines and configured to sense variation of currents in the first conductive lines or the second conductive lines, the variation of the currents being used to determine a touching position of a touching conductor.

Hereinafter, the steps of forming the first electromagnetic induction layer and the second electromagnetic induction layer are explained with an example according to one embodiment of the present disclosure.

Step S11: providing a substrate.

Step S12: forming a first ITO layer with a thickness of 600 A on the substrate, and forming a first electromagnetic induction layer by patterning processes (the processes of exposing, developing and etching), the first electromagnetic induction layer including a plurality of first ITO conductive lines (i.e. the first conductive lines in the above embodiment) arranged in a first direction, wherein the first ITO conductive line is 50 um in width and 500 um in spacing.

Step 13: forming a SiNx isolation layer with a thickness of 4000 A on the first electromagnetic induction layer, and etching via holes around the isolation layer so as to connecting the driver circuit and second ITO conductive lines (i.e. the second conductive lines in the above embodiment) formed on the second electromagnetic induction layer which is formed subsequently.

Step S14: forming a second ITO layer with a thickness of 600 A on the substrate, and forming the second electromagnetic induction layer by patterning processes (the processes of exposing, developing and etching), the second electromagnetic induction layer including a plurality of second ITO conductive lines arranged in the second direction, the second ITO wire being 50 um in width and 500 um in spacing.

The above is only optional embodiments of the present disclosure, it should be noted that several improvements and modifications may be made for those of ordinary skill in the art without departing from the principle of the present disclosure, and also should be considered to fall within the protection scope of the present disclosure.

What is claimed is:

1. An inductive touch screen comprising:
 a first electromagnetic induction layer comprising a plurality of first conductive lines arranged in a first direction;
 a second electromagnetic induction layer comprising a plurality of second conductive lines arranged in a second direction, and the second conductive lines being intersected with and isolated from the first conductive lines;
 a driver circuit connected to the first conductive lines and the second conductive lines and configured to alternately supply driving currents to the first conductive lines and the second conductive lines to cause the first conductive lines or the second conductive lines to generate magnetic fields; and
 a sensor circuit connected to the first conductive lines and the second conductive lines and configured to sense variation of currents in the first conductive lines or the second conductive lines, so as to determine a touching position of a touching conductor;
 wherein the sensor circuit comprises a plurality of sensor sub-circuits corresponding to the first conductive lines and the second conductive lines in a one-to-one manner;
 each of the sensor sub-circuits comprises:
 a current sensing amplifier circuit having an end connected to a corresponding one of the first or second conductive lines and an another end connected to an inductive capacitor; wherein the current sensing amplifier circuit is configured to sense the variation of the currents in the corresponding one of the first or second conductive lines, and the corresponding one of the first or second conductive lines is connected to an input terminal of the driver circuit; and
 the inductive capacitor having an end connected to the current sensing amplifier circuit and an another end connected to an output terminal of the driver circuit.

2. The inductive touch screen according to claim 1, further comprising a processing unit connected to the sensor circuit, and configured to receive the variation of the currents in the conductive lines sensed by the sensor circuit and determine the touching position of the touching conductor based on the variation of the currents.

3. The inductive touch screen according to claim 2, wherein the processing unit is provided with a predetermined threshold, and the processing unit judges whether a touching is valid by comparing the variation of the currents with the predetermined threshold.

4. The inductive touch screen according to claim 1, wherein a spacing between every two adjacent first conductive lines is identical.

5. The inductive touch screen according to claim 4, wherein the spacing between every two adjacent first conductive lines is 100-800 μm.

6. The inductive touch screen according to claim 4, wherein a spacing between every two adjacent second conductive lines is identical.

7. The inductive touch screen according to claim 6, wherein the spacing between every two adjacent second conductive lines is 100-800 μm.

8. A display panel comprising an inductive touch screen; wherein the inductive touch screen comprises:
 a first electromagnetic induction layer comprising a plurality of first conductive lines arranged in a first direction;
 a second electromagnetic induction layer comprising a plurality of second conductive lines arranged in a second direction, and the second conductive lines being intersected with and isolated from the first conductive lines;
 a driver circuit connected to the first conductive lines and the second conductive lines and configured to alternately supply driving currents to the first conductive lines and the second conductive lines to cause the first conductive lines or the second conductive lines to generate magnetic fields; and
 a sensor circuit connected to the first conductive lines and the second conductive lines and configured to sense variation of currents in the first conductive lines or the second conductive lines, so as to determine a touching position of a touching conductor;
 wherein the sensor circuit comprises a plurality of sensor sub-circuits corresponding to the first conductive lines and the second conductive lines in a one-to-one manner;
 each of the sensor sub-circuits comprises:
 a current sensing amplifier circuit having an end connected to a corresponding one of the first or second conductive lines and an another end connected to an inductive capacitor; wherein the current sensing amplifier circuit is configured to sense the variation of the currents in the corresponding one of the first or second conductive lines, and the corresponding one of the first or second conductive lines is connected to an input terminal of the driver circuit; and
 the inductive capacitor having an end connected to the current sensing amplifier circuit and an another end connected to an output terminal of the driver circuit.

9. The display panel according to claim 8, further comprising an array substrate having gate lines and data lines; wherein the first conductive lines are arranged to be overlapped with the gate lines, respectively; and the second conductive lines are arranged to be overlapped with the data lines, respectively.

10. The display panel according to claim 9, wherein the inductive touch screen further comprises connection wires arranged at each of two ends of each of the first or the second conductive lines; the first conductive lines and the second conductive lines are connected to the driver circuit and the sensor circuit by the connection wires, and the connection wires are provided within a non-displaying area of the display panel.

11. The display panel according to claim 8, further comprising a processing unit connected to the sensor circuit, and configured to receive the variation of the currents in the conductive lines sensed by the sensor circuit and determine the touching position of the touching conductor based on the variation of the currents.

12. The display panel according to claim 11, wherein the processing unit is provided with a predetermined threshold, and the processing unit judges whether a touching is valid by comparing the variation of the currents with the predetermined threshold.

13. The display panel according to claim 8, wherein a spacing between every two adjacent first conductive lines is identical.

14. The display panel according to claim 13, wherein the spacing between every two adjacent first conductive lines is 100-800 μm.

15. The display panel according to claim 13, wherein a spacing between every two adjacent second conductive lines is identical.

16. A display apparatus comprising a display panel; wherein the display panel comprises an inductive touch screen;
wherein the inductive touch screen comprises:
a first electromagnetic induction layer comprising a plurality of first conductive lines arranged in a first direction;
a second electromagnetic induction layer comprising a plurality of second conductive lines arranged in a second direction, and the second conductive lines being intersected with and isolated from the first conductive lines;
a driver circuit connected to the first conductive lines and the second conductive lines and configured to alternately supply driving currents to the first conductive lines and the second conductive lines to cause the first conductive lines or the second conductive lines to generate magnetic fields; and
a sensor circuit connected to the first conductive lines and the second conductive lines and configured to sense variation of currents in the first conductive lines or the second conductive lines, so as to determine a touching position of a touching conductor;
wherein the sensor circuit comprises a plurality of sensor sub-circuits corresponding to the first conductive lines and the second conductive lines in a one-to-one manner;
each of the sensor sub-circuits comprises:
a current sensing amplifier circuit having an end connected to a corresponding one of the first or second conductive lines and an another end connected to an inductive capacitor; wherein the current sensing amplifier circuit is configured to sense the variation of the currents in the corresponding one of the first or second conductive lines, and the corresponding one of the first or second conductive lines is connected to an input terminal of the driver circuit; and
the inductive capacitor having an end connected to the current sensing amplifier circuit and an another end connected to an output terminal of the driver circuit.

17. The display apparatus according to claim 16, further comprising an array substrate having gate lines and data lines; wherein the first conductive lines are arranged to be overlapped with the gate lines, respectively; and the second conductive lines are arranged to be overlapped with the data lines, respectively.

18. The display apparatus according to claim 17, wherein the inductive touch screen further comprises connection wires arranged at each of two ends of each of the first or the second conductive lines; the first conductive lines and the second conductive lines are connected to the driver circuit and the sensor circuit by the connection wires, and the connection wires are provided within a non-displaying area of the display panel.

19. The display apparatus according to claim 16, wherein the inductive touch screen further comprises a processing unit connected to the sensor circuit, and configured to receive the variation of the currents in the conductive lines sensed by the sensor circuit and determine the touching position of the touching conductor based on the variation of the currents.

* * * * *